(12) United States Patent
Hara

(10) Patent No.: US 11,316,435 B2
(45) Date of Patent: Apr. 26, 2022

(54) INSULATED DC/DC CONVERTER, AC/DC CONVERTER, POWER ADAPTER, AND ELECTRIC DEVICE

(71) Applicant: Rohm Co., Ltd., Kyoto (JP)

(72) Inventor: Hideo Hara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 29 days.

(21) Appl. No.: 16/896,795

(22) Filed: Jun. 9, 2020

(65) Prior Publication Data
US 2020/0395862 A1    Dec. 17, 2020

(30) Foreign Application Priority Data
Jun. 14, 2019 (JP) .............................. JP2019-110926

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC . H02M 3/33592; H02M 3/33523; H02M 1/08
See application file for complete search history.

(56) References Cited

U.S. PATENT DOCUMENTS

| | | | | |
|---|---|---|---|---|
| 7,697,310 B2 * | 4/2010 | Nakamura | ........ | H02M 3/33592 363/127 |
| 10,193,457 B1 * | 1/2019 | Hande | ...................... | H02M 1/08 |
| 2007/0250186 A1 * | 10/2007 | Higuchi | ................... | G05B 5/01 700/37 |
| 2016/0261204 A1 * | 9/2016 | Kikuchi | ............ | H02M 3/33592 |
| 2016/0344296 A1 * | 11/2016 | Luo | .................... | H02M 3/33592 |
| 2020/0083874 A1 * | 3/2020 | Zhuo | ........................ | H03K 7/08 |

FOREIGN PATENT DOCUMENTS

JP     2006-197688     7/2006

* cited by examiner

*Primary Examiner* — Alex Torres-Rivera
(74) *Attorney, Agent, or Firm* — Fish & Richardson P.C.

(57) ABSTRACT

There is provided an insulated DC/DC converter configured to generate a secondary voltage on a secondary side of a power transformer from a primary voltage on a primary side of the power transformer by switching a switching element connected to a primary winding of the power transformer while insulating the primary side and the secondary side of the power transformer from each other, including: a communication transformer; a secondary control circuit including a PWM controller configured to generate a PWM signal of a constant PWM frequency based on the secondary voltage in a circuit arranged on the secondary side; and a primary control circuit configured to switch the switching element at the PWM frequency based on information of the PWM signal transmitted from the secondary control circuit via the communication transformer in a circuit arranged on the primary side.

11 Claims, 9 Drawing Sheets

First reference device

First reference device

Second reference device

INSULATED DC/DC CONVERTER, AC/DC CONVERTER, POWER ADAPTER, AND ELECTRIC DEVICE

CROSS-REFERENCE TO RELATED APPLICATION

This application is based upon and claims the benefit of priority from Japanese Patent Application No. 2019-110926, filed on Jun. 14, 2019, the entire contents of which are incorporated herein by reference.

TECHNICAL FIELD

The present disclosure relates to an insulated DC/DC converter, an AC/DC converter, a power adapter, and an electric device.

BACKGROUND

There is an AC/DC converter that obtains a desired DC voltage from an AC voltage. A current control method may be used in the AC/DC converter. The current control method is a typical control method of PWM control used not only in the AC/DC converter but also in many switching power sources. In the current control method of the PWM control, a feedback voltage corresponding to an output voltage is compared with a reference voltage, and a duty of a switching transistor is adjusted depending on a difference therebetween.

Although such current control method may easily cope with noise because the switching frequency is constant, it is inferior to an on-time control method used in step-down DC/DC converters or the like, in terms of load responsiveness, the number of required parts, and the like. On the other hand, the on-time control method is superior in load responsiveness or the number of required parts, but it may be difficult to cope with noise because the stabilization of output is realized by adjusting the switching frequency. The on-time control method will also be described below.

It would be beneficial if the merits of the on-time control method could be obtained while keeping the switching frequency constant (while using the PWM control) in consideration of noise response.

SUMMARY

Some embodiments of the present disclosure provide an insulated DC/DC converter capable of obtaining merits of an on-time control method while using PWM control, and an AC/DC converter, a power adapter, and an electric device using the same.

According to one embodiment of the present disclosure, there is provided an insulated DC/DC converter configured to generate a secondary voltage on a secondary side of a power transformer from a primary voltage on a primary side of the power transformer by switching a switching element connected to a primary winding of the power transformer while insulating the primary side and the secondary side of the power transformer from each other, including: a communication transformer; a secondary control circuit including a PWM controller configured to generate a PWM signal of a constant PWM frequency based on the secondary voltage in a circuit arranged on the secondary side; and a primary control circuit configured to switch the switching element at the PWM frequency based on information of the PWM signal transmitted from the secondary control circuit via the communication transformer in a circuit arranged on the primary side, wherein the PWM controller includes: an oscillator configured to generate an oscillation signal having the PWM frequency; an on-time setting part configured to set an on-time of the switching element based on a comparison result of a feedback voltage based on the secondary voltage and a predetermined reference voltage, and a duty information signal indicating a duty of the switching element; and a PWM signal generator configured to generate and output the PWM signal based on the oscillation signal and a setting result of the on-time setting part (first configuration).

In the insulated DC/DC converter according to the first configuration, the on-time setting part includes: a comparator part configured to generate a comparator signal based on the comparison result of the feedback voltage and the reference voltage; and a correction part configured to correct the duty information signal by the comparator signal to generate a corrected duty information signal, and the on-time setting part is configured to set the on-time of the switching element based on the corrected duty information signal (second configuration).

In the insulated DC/DC converter according to the second configuration, the on-time setting part further includes a counter, and the on-time setting part is configured to set the on-time of the switching element by measuring a time corresponding to the corrected duty information signal using the counter (third configuration).

In the insulated DC/DC converter according to any one of the first to third configurations, the secondary voltage is stabilized at a predetermined target voltage by matching the feedback voltage with the reference voltage, and the on-time setting part is configured to correct the on-time of the switching element to increase based on the feedback voltage when the secondary voltage is lower than the target voltage, and to correct the on-time of the switching element to decrease based on the feedback voltage when the secondary voltage is higher than the target voltage (fourth configuration).

In the insulated DC/DC converter according to any one of the first to fourth configurations, a first section in which the switching element is turned on and a second section in which the switching element is turned off are indicated by the PWM signal generated by the PWM signal generator, and the PWM signal generator is configured to set a start timing of the first section based on the oscillation signal, and to set a length of the first section to a length of the on-time set by the on-time setting part (fifth configuration).

In the insulated DC/DC converter according to the fifth configuration, the first section and the second section are alternately set by the PWM signal generated by the PWM signal generator, the secondary control circuit includes a transmitter configured to output a predetermined ON command signal to the communication transformer at a transition timing from the second section to the first section based on the PWM signal, and to output a predetermined OFF command signal to the communication transformer at a transition timing from the first section to the second section, and the primary control circuit includes a receiver configured to receive the ON command signal and the OFF command signal via the communication transformer, in which the switching element is turned on in response to reception of the ON command signal and the switching element is turned off in response to reception of the OFF command signal (sixth configuration).

In the insulated DC/DC converter according to any one of the first to sixth configurations, the PWM controller includes a duty information acquisition part configured to acquire the duty information signal based on the PWM signal output from the PWM signal generator (seventh configuration).

In the insulated DC/DC converter according to the sixth configuration, the PWM controller includes a duty information acquisition part configured to acquire the duty information signal based on an output signal of the transmitter (eighth configuration).

In the insulated DC/DC converter according to any one of the first to sixth configurations, a voltage varying in response to switching of the switching element is generated at one terminal of the secondary winding of the power transformer, and the PWM controller includes a duty information acquisition part configured to acquire the duty information signal based on the voltage at the one terminal (ninth configuration).

According to another embodiment of the present disclosure, there is provided an AC/DC converter, including: a rectifying circuit configured to full-wave rectify an AC voltage; a smoothing capacitor configured to smooth the full-wave rectified voltage to generate a DC voltage; and the insulated DC/DC converter according to any one of the first to ninth configurations, configured to generate a DC secondary voltage as an output voltage from the primary voltage as the DC voltage (tenth configuration).

According to further embodiment of the present disclosure, there is provided a power adapter, including: a plug configured to receive an AC voltage; the AC/DC converter according to the tenth configuration; and a housing configured to accommodate the AC/DC converter (eleventh configuration).

According to still further embodiment of the present disclosure, there is provided an electric device, including: the AC/DC converter according to the tenth configuration; and a load driven based on an output voltage of the AC/DC converter (twelfth configuration).

BRIEF DESCRIPTION OF DRAWINGS

The accompanying drawings, which are incorporated in and constitute a part of the specification, illustrate embodiments of the present disclosure.

DETAILED DESCRIPTION

Figure 1:
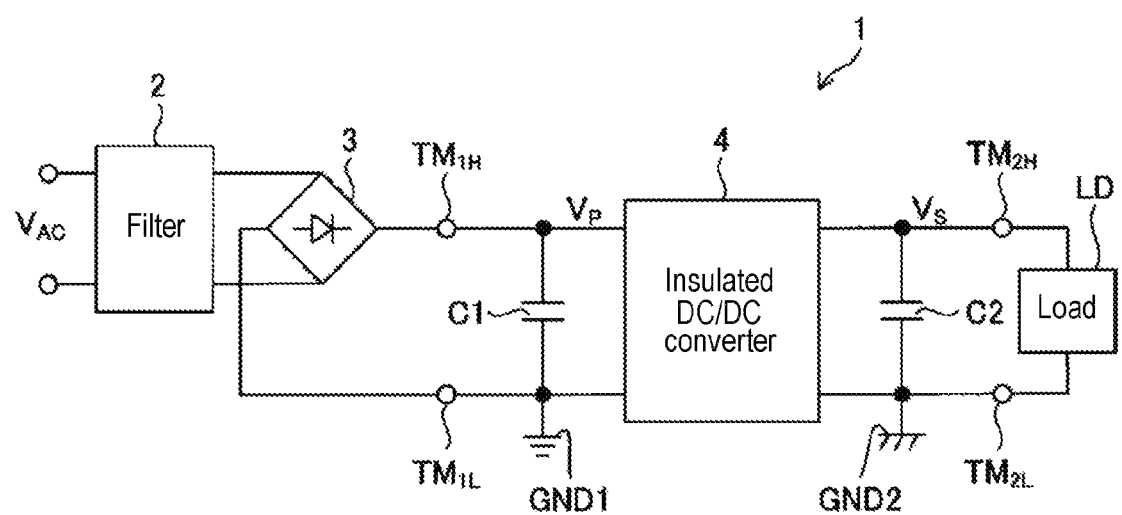
FIG. 1 is a diagram illustrating an overall configuration of an AC/DC converter according to a first embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Exemplary embodiments of the present disclosure will be now described in detail with reference to the drawings. In each of the drawings referred to, the same parts are denoted by the same reference numerals and a repeated description thereof will be omitted in principle. Further, in the present disclosure, for the simplification of description, names of information, signals, physical quantities, elements, parts, or the like corresponding to reference symbols or numerals may be omitted or abbreviated by specifying the reference symbols or numerals referring to the information, signals, physical quantities, elements, parts, or the like. For example, a switching transistor referred to by "M1" as described below (see FIG. 2) may be represented as a switching transistor M1 or may be abbreviated as a transistor M1, but they all refer to the same one.

First, some terms used in the embodiments of the present disclosure will be described. A level may refer to a potential level, in which a high level has a potential higher than a low level for any signal or voltage. For any signal or voltage, the high level of the signal or voltage may mean that the level of the signal or voltage is a high level, and the low level of the signal or voltage may mean that the level of the signal or voltage is a low level. The level of the signal may be referred to as a signal level and the level of the voltage may be referred to as a voltage level. For any signal or voltage, the transition from a low level to a high level will be referred to as an up edge, and the timing of transition from a low level to a high level will be referred to as an up edge timing. Similarly, for any signal or voltage, the transition from a high level to a low level will be referred to as a down edge, and the timing of transition from a high level to a low level will be referred to as a down edge timing.

For any transistor configured as a FET (field effect transistor) including a MOSFET, an ON state refers to a conduction state between a drain and a source of the transistor, and an OFF state refers to a non-conduction state (blocking state) between the drain and the source of the transistor. The same applies to transistors that are not classified as FETs. Unless otherwise specified, the MOSFET may be understood as an enhancement type MOSFET. The MOSFET is an abbreviation for "metal-oxide-semiconductor field-effect transistor." PWM is an abbreviation for pulse width modulation.

For any transistor, the ON state and the OFF state may be simply represented as ON and OFF below. For any transistor, the switching from the OFF state to the ON state will be represented as turn-on, and the switching from the ON state to the OFF state will be represented as turn-off. In addition, for any transistor, a section in which the transistor is in an ON state may be referred to as an ON section, and a section in which the transistor is in an OFF state may be referred to as an OFF section. For any signal having a signal level of a high level or a low level, a section in which the level of the signal is a high level will be referred to as a high level section, and a section in which the level of the signal is a low level will be referred to as a low level section. The same applies to any voltage having a voltage level of a high level or a low level.

<<First Embodiment>>

A first embodiment of the present disclosure will be described. FIG. 1 is an overall configuration diagram of an AC/DC converter 1 according to the first embodiment. The AC/DC converter 1 includes a filter 2, a rectifying circuit 3, a DC/DC converter 4 which is an insulated DC/DC converter 4, a smoothing capacitor C1, and an output capacitor C2. The output capacitor C2 may be understood as being included in the components of the DC/DC converter 4. Although the details will be apparent from the following description, the AC/DC converter 1 generates a secondary voltage $V_S$ from a primary voltage $V_P$ by a switching method using a transformer.

The AC/DC converter 1 includes a primary circuit arranged on a primary side of the AC/DC converter 1 and a secondary circuit arranged on a secondary side of the AC/DC converter 1, in which the primary circuit and the secondary circuit are electrically insulated from each other. Furthermore, when attention is paid to the DC/DC converter 4, the primary circuit is understood as a primary circuit arranged on a primary side of the DC/DC converter 4 and the secondary circuit is understood as a secondary circuit arranged on a secondary side of the DC/DC converter 4. The filter 2, the rectifying circuit 3, and the smoothing capacitor C1 are arranged in the primary circuit, and the output capacitor C2 is arranged in the secondary circuit. The DC/DC converter 4 is arranged across the primary circuit and the secondary circuit.

A ground in the primary circuit will be referred to by "GND1," and a ground in the secondary circuit will be referred to by "GND2." A voltage in the primary circuit including the primary voltage $V_P$ is a voltage based on the ground GND1. A voltage in the secondary circuit including the secondary voltage $V_S$ is a voltage based on the ground GND2. In each of the primary circuit and the secondary circuit, the ground indicates a conductive part (a predetermined potential point) having a reference potential of 0 V (zero volt) or the reference potential itself. However, since the ground GND1 and the ground GND2 are insulated from each other, they may have different potentials.

The filter 2 removes noise of an AC voltage $V_{AC}$ input to the AC/DC converter 1. The AC voltage $V_{AC}$ may be a commercial AC voltage. The rectifying circuit 3 is a diode bridge circuit which full-wave rectifies the AC voltage $V_{AC}$ supplied via the filter 2. The smoothing capacitor C1 smooths the full-wave rectified voltage to generate a DC voltage. The DC voltage generated by the smoothing capacitor C1 functions as the primary voltage $V_P$. The primary voltage $V_P$ is applied between a pair of input terminals $TM_{1H}$ and $TM_{1L}$. Specifically, a low potential terminal of the smoothing capacitor C1 is connected to the ground GND1 and to the input terminal $TM_{1L}$, and a high potential terminal of the smoothing capacitor C1 is connected to the input terminal $TM_{1H}$. Furthermore, the primary voltage $V_P$ is applied to the input terminal $TM_{1H}$ with reference to a potential at the input terminal $TM_{1L}$.

The DC/DC converter 4 performs power conversion (DC-DC conversion) of the primary voltage $V_P$ by a switching method to generate the secondary voltage $V_S$ stabilized at a predetermined target voltage $V_{TG}$. The secondary voltage $V_S$ corresponds to an output voltage of the AC/DC converter 1, and is applied between a pair of output terminals $TM_{2H}$ and $TM_{2L}$. Specifically, a low potential terminal of the output capacitor C2 is connected to the ground GND2 and to the output terminal $TM_{2L}$, and a high potential terminal of the output capacitor C2 is connected to the output terminal $TM_{2H}$. Furthermore, the secondary voltage $V_S$ is applied to the output terminal $TM_{2H}$ with reference to a potential at the output terminal $TM_{2L}$. The pair of input terminals $TM_{1H}$ and $TM_{1L}$ may be considered to correspond to a pair of input terminals in the DC/DC converter 4, and the pair of output terminals $TM_{2H}$ and $TM_{2L}$ may be considered to correspond to a pair of output terminals in the AC/DC converter 1 or the DC/DC converter 4.

A load LD is also illustrated in FIG. 1. The load LD may be considered to be a load of the AC/DC converter 1, or may be considered to be a load of the DC/DC converter 4 when focusing on the DC/DC converter 4. The load LD is an arbitrary load connected to the pair of output terminals $TM_{2H}$ and $TM_{2L}$ and driven based on the secondary voltage $V_S$. For example, the load LD is a microcomputer, a DSP (digital signal processor), a power circuit, a lighting device, an analog circuit, or a digital circuit.

Figure 2:
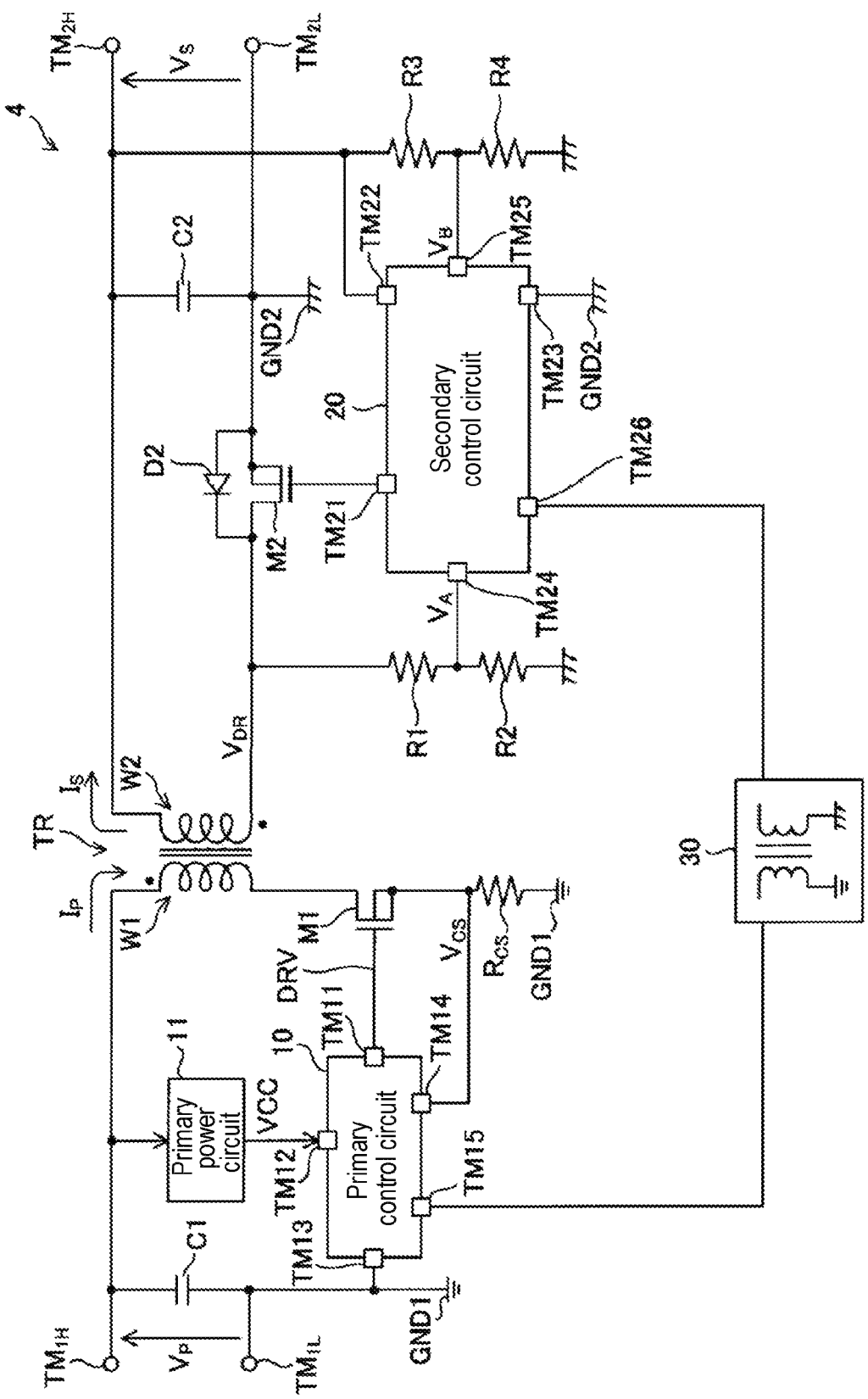
FIG. 2 is a configuration diagram of a DC/DC converter included in the AC/DC converter according to the first embodiment of the present disclosure.

FIG. 2 illustrates an internal configuration example of the DC/DC converter 4 installed in the AC/DC converter 1. The DC/DC converter 4 includes a transformer TR which is a power transformer having a primary winding W1 and a secondary winding W2. In the transformer TR, the primary winding W1 and the secondary winding W2 are magnetically coupled to each other with opposite polarities while being electrically insulated.

In the primary circuit of the DC/DC converter 4 (in other words, the primary circuit of the AC/DC converter 1), a primary control circuit 10, a primary power circuit 11, the smoothing capacitor C1, a switching transistor M1 as an example of a switching element, and a sense resistor $R_{CS}$ are installed in addition to the primary winding W1. When focusing on the DC/DC converter 4, the smoothing capacitor C1 will also be referred to as an input capacitor C1. As described above, the input capacitor C1 is installed between the input terminals $TM_{1L}$ and $TM_{1H}$, and the primary voltage $V_P$ is applied between both terminals of the input capacitor C1.

The switching transistor M1 is configured as an N-channel MOSFET (metal-oxide-semiconductor field-effect transistor). One end of the primary winding W1 is connected to the input terminal $TM_{1H}$ to receive the DC primary voltage $V_P$. The other end of the primary winding W1 is connected to a drain of the switching transistor M1, and a source of the switching transistor M1 is connected to the ground GND1 via the sense resistor $R_{CS}$. The primary power circuit 11 generates a power source voltage VCC having a desired voltage value by performing DC-DC conversion on the primary voltage $V_P$ and supplies it to the primary control circuit 10. The primary control circuit 10 is driven based on the power source voltage (driving voltage) VCC.

The primary control circuit 10 is connected to a gate of the switching transistor M1, and performs switching driving on the switching transistor M1 by supplying a driving signal DRV to the gate of the switching transistor M1. The driving signal DRV is a rectangular wave-shaped signal whose signal level is switched between a low level and a high level. When a low level signal and a high level signal are supplied to the gate of the transistor M1, the transistor M1 is turned off and on, respectively.

In the secondary circuit of the DC/DC converter 4 (in other words, the secondary circuit of the AC/DC converter 1), a secondary control circuit 20, a synchronous rectification transistor M2, a diode D2, voltage dividing resistors R1 to R4, and an output capacitor C2 are installed in addition to the secondary winding W2. The synchronous rectification transistor M2 (hereinafter, referred to as an SR transistor M2) is configured as an N-channel MOSFET. The diode D2 is a parasitic diode of the SR transistor M2. Therefore, the diode D2 is connected in parallel to the SR transistor M2 with the direction from a source to a drain of the SR transistor M2 as a forward direction. The diode D2 may be a diode installed separately from the parasitic diode.

One end of the secondary winding W2 is connected to the output terminal $TM_{2H}$, and therefore the secondary voltage $V_S$ is applied to one end of the secondary winding W2. The other end of the secondary winding W2 is connected to the drain of the SR transistor M2. A voltage at the other end of the secondary winding W2 (in other words, a drain voltage of the SR transistor M2) is represented by "$V_{DR}$." A connection node between the other end of the secondary winding W2 and the drain of the SR transistor M2 is connected to one end of the voltage dividing resistor R1, and the other end of the voltage dividing resistor R1 is connected to the ground GND2 via the voltage dividing resistor R2. Therefore, a voltage $V_A$, which is a divided voltage of the voltage $V_{DR}$, is applied to a connection node between the voltage dividing resistors R1 and R2. On the other hand, the output terminal $TM_{2H}$, to which the secondary voltage $V_S$ is applied, is connected to one end of the voltage dividing resistor R3, and the other end of the voltage dividing resistor R3 is connected to the ground GND2 via the voltage dividing resistor R4. Therefore, a voltage $V_B$, which is a divided voltage of the secondary voltage $V_S$, is applied to a connection node between the voltage dividing resistors R3 and R4. Of course, similar to the secondary voltage $V_S$, the voltages $V_{DR}$, $V_A$, and $V_B$ are voltages with respect to the ground GND2.

The source of the SR transistor M2 is connected to the ground GND2. As described above, since the output capacitor C2 is installed between the output terminals $TM_{2H}$ and $TM_{2L}$, the secondary voltage $V_S$ is applied between both terminals of the output capacitor C2.

The secondary control circuit 20 is driven by using the secondary voltage $V_S$ as the power source voltage (driving voltage). The secondary control circuit 20 controls ON/OFF of the SR transistor M2 by controlling a gate voltage of the SR transistor M2. The secondary control circuit 20 can perform the control based on the voltage $V_A$ or based on the voltages $V_A$ and $V_B$, and at this time, can control the gate voltage of the SR transistor M2 so that the transistors M1 and M2 are not simultaneously turned on.

In the DC/DC converter 4, a pulse transformer part 30 is installed across the primary circuit and the secondary circuit. The pulse transformer part 30 is a communication transformer for realizing communication between the primary control circuit 10 and the secondary control circuit 20, and is configured with one or more pulse transformers. The communication through the pulse transformer part 30 is an insulation type communication (i.e., communication in a state in which the primary circuit and the secondary circuit are insulated). The communication between the control circuits 10 and 20 is a one-way communication capable of transmitting a signal from one of the control circuits 10 and 20 to the other thereof, or a bidirectional communication between the control circuits 10 and 20. In the present embodiment, it is assumed below that the signal transmission from the secondary control circuit 20 to the primary control circuit 10 via the pulse transformer part 30 is possible.

The primary control circuit 10 may generate the driving signal DRV based on a current sense voltage $V_{CS}$ corresponding to a voltage drop in the sense resistor $R_{CS}$, and may also generate the driving signal DRV under the control of the secondary control circuit 20 via the pulse transformer part 30.

A plurality of terminals are installed in the primary control circuit 10. The plurality of terminals installed in the primary control circuit 10 include a terminal TM11 connected to the gate of the switching transistor M1, a terminal TM12 for receiving the power source voltage VCC, a terminal TM13 connected to the ground GND1, a terminal TM14 for receiving the current sense voltage $V_{CS}$, and a terminal TM15 connected to the pulse transformer part 30 on the primary side. The terminal TM15 may be configured by two or more terminals.

A plurality of terminals are installed in the secondary control circuit 20. The plurality of terminals installed in the secondary control circuit 20 include a terminal TM21 connected to the gate of the SR transistor M2, a terminal TM22 for receiving the secondary voltage $V_S$, a terminal TM23 connected to the ground GND2, a terminal TM24 for receiving the voltage $V_A$, a terminal TM25 for receiving the voltage $V_B$, and a terminal TM26 connected to the pulse transformer part 30 on the secondary side. The terminal TM26 may be configured by two or more terminals.

In the DC/DC converter 4 configured in this manner, the secondary voltage $V_S$ can be obtained from the primary voltage $V_P$ by switching the switching transistor M1 (in other words, by switching-controlling the switching transistor M1). That is, energy is stored in the primary winding W1 in an ON section of the switching transistor M1 and the stored energy is discharged from the secondary winding W2 in an OFF section of the switching transistor M1 such that the output capacitor C2 can be charged to obtain the secondary voltage $V_S$. The loss can be reduced by turning on the SR transistor M2 when the energy is discharged from the secondary winding W2.

Furthermore, instead of installing the primary power circuit 11, an auxiliary winding may be installed in the transformer TR, and the power source voltage VCC of the primary control circuit 10 may be generated by a self-power circuit configured by including the auxiliary winding.

In addition, a current flowing via the sense resistor $R_{CS}$ will be referred to as a primary current denoted by symbol "$I_P$." The primary current $I_P$ is a current flowing from the input terminal $TM_{1H}$ to the ground GND1 via the primary side winding W1 and the switching transistor M1. In the secondary circuit, a current flowing from the ground GND2 to the output terminal $TM_{2H}$ via the secondary winding W2 will be referred to as a secondary current denoted by symbol "$I_S$."

[Examples of Signal Waveforms During Synchronous Rectification]

Figure 3:
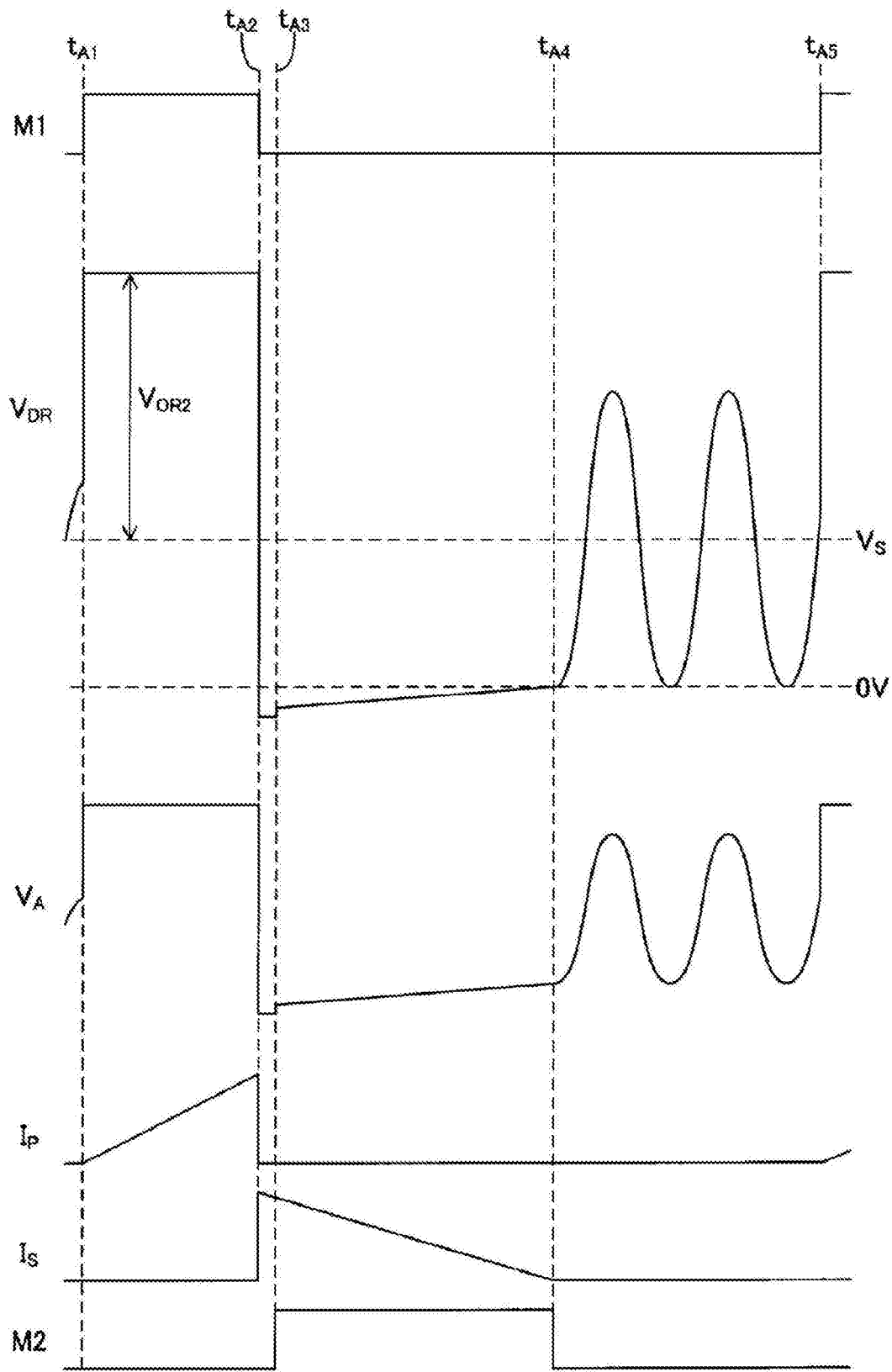
FIG. 3 is a waveform diagram of various signals when synchronous rectification is performed according to the first embodiment of the present disclosure.

FIG. 3 illustrates an example of each signal waveform during synchronous rectification which can be performed in the DC/DC converter 4. In the example of FIG. 3, the switching transistor M1 is turned on in a section between timings $t_{A1}$ and $t_{A2}$, and then the switching transistor M1 is turned off in a section up to timing $t_{A5}$.

In the ON section of the switching transistor M1, the current $I_P$ flows via the primary winding W1 and the voltage $V_{DR}$ is higher than the secondary voltage $V_S$ by a voltage $V_{OR2}$. The voltage $V_{OR2}$ is an induced voltage generated in the secondary winding W2 in the ON section of the switching transistor M1. When the switching transistor M1 is turned off at timing $t_{A2}$, the voltages $V_{DR}$ and $V_A$ sharply drop to a voltage lower than the ground GND2, and a secondary current $I_S$ flows via the diode D2. The secondary control circuit 20 can quickly turn on the SR transistor M2 when the switching transistor M1 is turned off. For example, when the secondary control circuit 20 detects that the voltage $V_A$ is below a predetermined negative turn-on determination voltage (for example, −100 mV), the secondary control circuit 20 can turn on the SR transistor M2. Timing $t_{A3}$ indicates a turn-on timing of the SR transistor M2.

After the SR transistor M2 is turned on, the secondary current $I_S$ flows via the channel of the SR transistor M2, in which the magnitude of the secondary current $I_S$ decreases as the stored energy of the transformer TR decreases. At timing $t_{A4}$ after timing $t_{A3}$, the secondary control circuit 20 turns off the SR transistor M2. For example, the secondary control circuit 20 can turn off the SR transistor M2 when the voltage $V_A$ becomes equal to or higher than a predetermined negative turn-off determination voltage (for example, −10 mV). The potential of the turn-off determination voltage is higher than the potential of the turn-on determination voltage. Thereafter, the switching transistor M1 is turned on at timing $t_{A45}$. Thereafter, similar operation is repeatedly performed.

Such control method of the SR transistor M2 will be referred to as a comparator method. As will be described below, in the DC/DC converter 4, the secondary control circuit 20 can mainly control ON/OFF of the switching transistor M1, and in this case, the comparator method is not used (but may be used). In any case, the transistors M1 and M2 are controlled so that the transistors M1 and M2 are not simultaneously turned on.

[Operation Flowchart]

Figure 4:
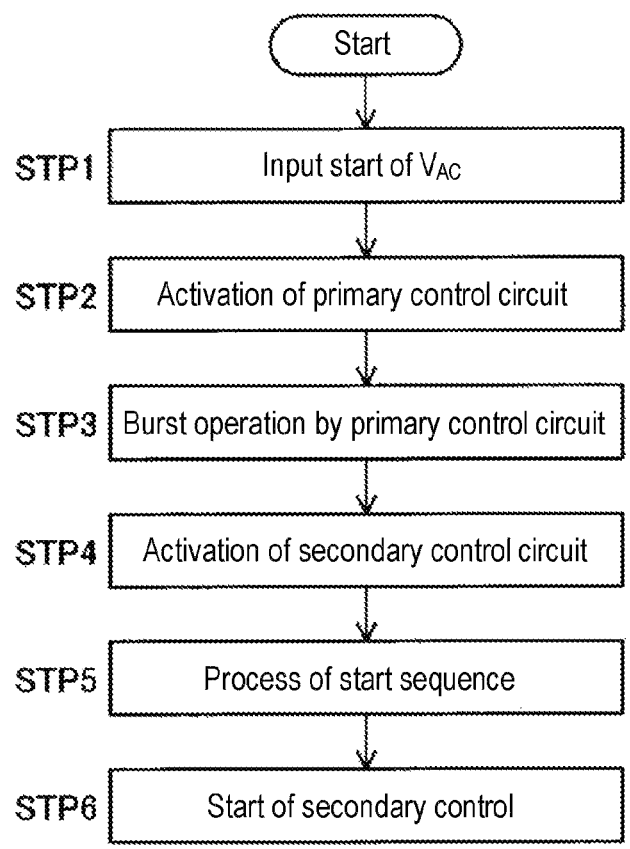
FIG. 4 is a diagram illustrating an operation flow of the AC/DC converter according to the first embodiment of the present disclosure.

FIG. 4 is an operation flowchart of the AC/DC converter 1 and the DC/DC converter 4. When input of an AC voltage $V_{AC}$ to the AC/DC converter 1 starts (step STP1), the primary voltage $V_P$ rises to generate a driving voltage VCC for activating the primary control circuit 10 so as to activate the primary control circuit 10 (step STP2). When the primary control circuit 10 is activated, the primary control circuit 10 first performs a predetermined burst operation (step STP3). In the burst operation, the primary control circuit 10 periodically and repeatedly performs an operation of turning on the switching transistor M1 and then turning off the switching transistor M1 when the voltage value of the current sense voltage $V_{CS}$ reaches a predetermined value. Consequently, when the output capacitor C2 is charged and the secondary voltage $V_S$ reaches a predetermined secondary start voltage, the secondary control circuit 20 is activated (step STP4). When the secondary control circuit 20 is activated, a start circuit (not shown) installed in the secondary control circuit 20 mainly performs a start sequence process including a process of transmitting a predetermined start signal to the primary control circuit 10 via the pulse transformer part 30 (step STP5). When the start sequence process is normally terminated, then secondary control for switching-driving the transistor M1 under the control of the secondary control circuit 20 starts (step STP6).

An example of the start sequence process will be illustrated. In the start sequence process, the start circuit (not shown) installed in the secondary control circuit 20 transmits a first start signal to the primary control circuit 10 via the pulse transformer part 30 during a section where it is determined that the transistor M1 is turned on based on the voltage $V_A$. The primary control circuit 10 terminates the burst operation and immediately turns off the transistor M1 in response to reception of the first start signal. The start circuit confirms that the transistor M1 is turned off in response to the first start signal based on the voltage $V_A$, and then sequentially transmits a plurality of second start signals to the primary control circuit 10 via the pulse transformer part 30. The primary control circuit 10 switches the state of the transistor M1 between ON and OFF each time it receives the second start signal. When the start circuit confirms that the state of the transistor M1 is switched between ON and OFF for each transmission of the second start signal based on the voltage $V_A$, the start circuit normally terminates the start sequence process.

In addition, when it is not confirmed in the start sequence process that the transistor M1 is switched between ON and OFF in response to the start signal, a predetermined error-handling process is performed. In the error-handling process, the start circuit can, for example, restart the start sequence process from the beginning.

Furthermore, the state of the transistor M1 when the start sequence process is normally terminated is assumed to be an OFF state. The secondary control after the normal termination of the start sequence process will be described below.

[PWM Control by Secondary Control]

The secondary control circuit 20 can perform PWM control for switching the transistor M1 at a predetermined PWM frequency as the secondary control, and can stabilize the secondary voltage $V_S$ at a predetermined target voltage $V_{TG}$ by controlling the duty of the transistor M1 based on the secondary voltage $V_S$ in the PWM control.

Figure 5:
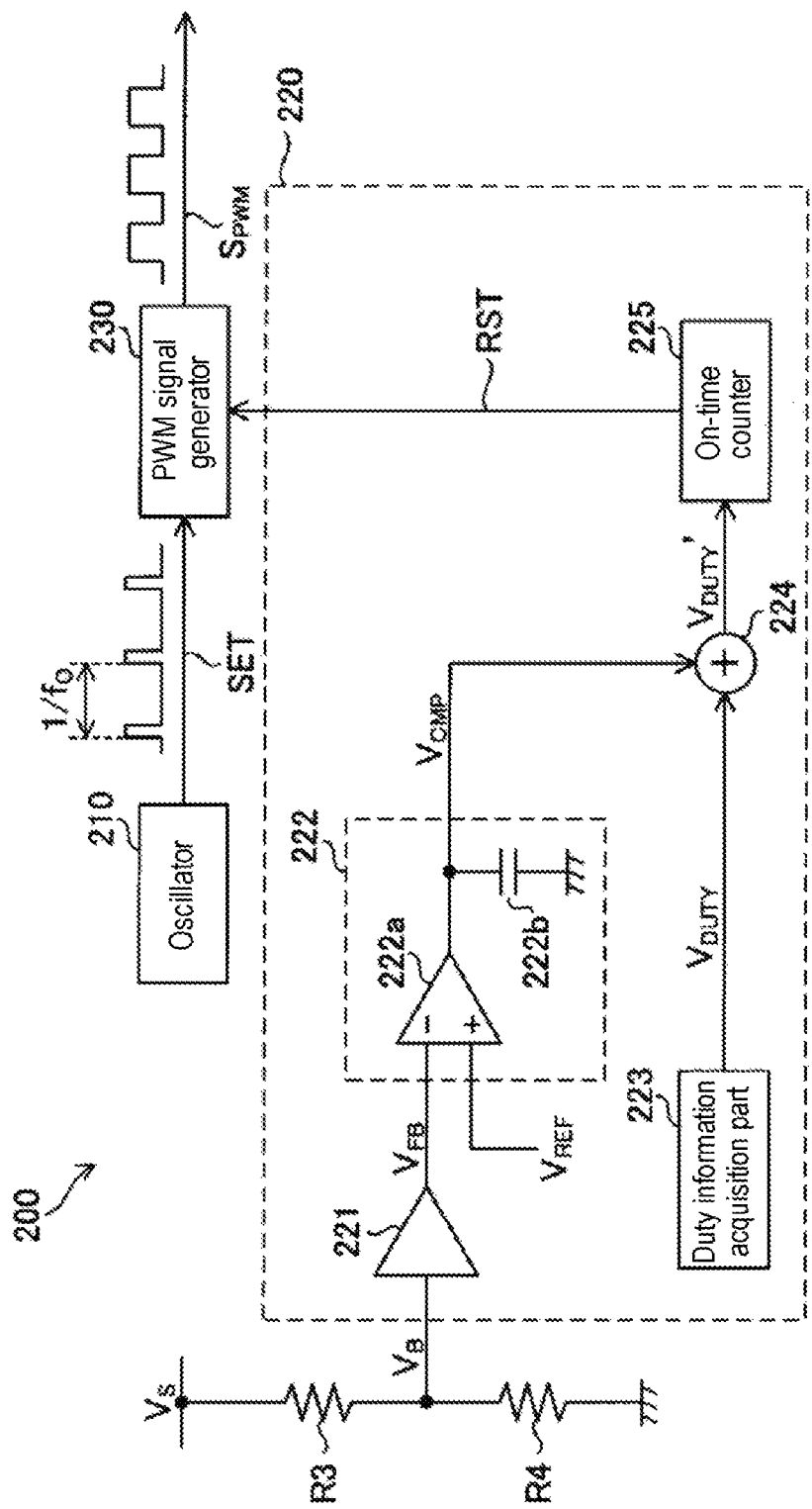
FIG. 5 is a configuration diagram of a PWM controller installed in a secondary control circuit according to the first embodiment of the present disclosure.
Figure 6:
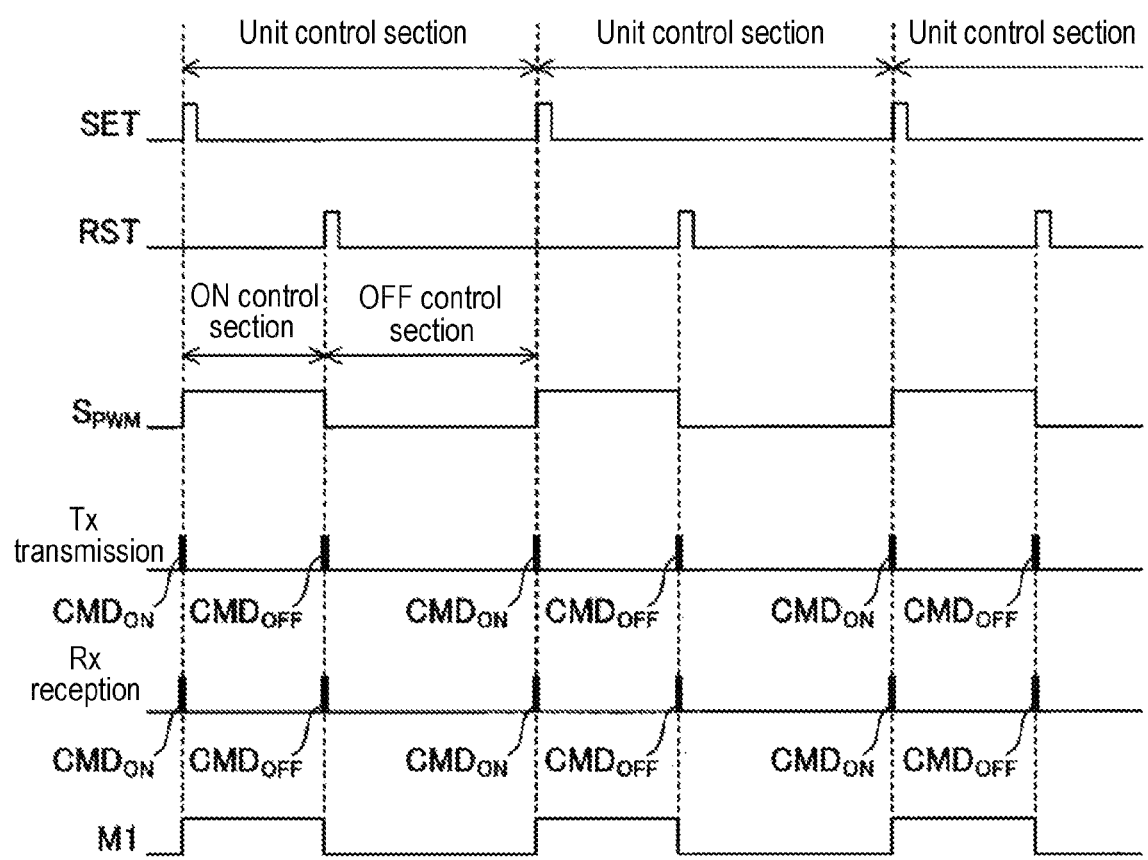
FIG. 6 is a diagram illustrating a relationship between some signals and states of a switching transistor according to the first embodiment of the present disclosure.

FIG. 5 illustrates a configuration of a PWM controller 200 for performing the PWM control. FIG. 6 illustrates a waveform diagram of signals related to the PWM control. The PWM controller 200 is installed in the secondary control circuit 20, and includes an oscillator 210, an on-time setting part 220, and a PWM signal generator 230, as illustrated in FIG. 5.

The oscillator 210 generates an oscillation signal having a predetermined PWM frequency and supplies the oscillation signal to the PWM signal generator 230 as a signal SET. The PWM frequency may be varied in order to realize loss reduction or the like at the time of light load, but it is assumed here that the PWM frequency is constant (i.e., fixed). Hereinafter, the PWM frequency may be represented by symbol "$f_O$." As illustrated in FIG. 6, the signal SET as the oscillation signal of the oscillator 210 is a binarized signal having a signal level of a high level or a low level. The duty of the signal SET is optional. In the signal SET, the interval of occurrence of two adjacent up edges is equal to the length of a PWM period corresponding to the reciprocal of the PWM frequency ($1/f_O$). In the signal SET, a section from the occurrence timing of one up edge to the occurrence timing of a next up edge will be referred to as a unit control section. The length of each unit control section is equal to the length of the PWM period. When the PWM control is performed, a plurality of unit control sections arranged in a time series are sequentially generated.

The on-time setting part 220 sets an on-time of the transistor M1 in each unit control section based on the secondary voltage $V_S$. As will be apparent from the following description, the on-time of the transistor M1 in the on-time setting part 220 is defined by a signal RST. As illustrated in FIG. 6, the signal RST is also a binarized signal having a signal level of a high level or a low level, and is supplied to the PWM signal generator 230.

The PWM signal generator 230 generates a signal $S_{PWM}$ which is a PWM signal based on the signals SET and RST. As illustrated in FIG. 6, the signal $S_{PWM}$ is also a binarized signal having a signal level of a high level or a low level. The signal $S_{PWM}$ functions as a switching signal for switching the transistor M1. The generator 230 switches the level of the signal $S_{PWM}$ from a low level to a high level at the up edge timing of the signal SET, and switches the level of the signal $S_{PWM}$ from a high level to a low level at the up edge timing of the signal RST.

The high level section of the signal $S_{PWM}$ corresponds to an ON control section, and the low level section of the signal $S_{PWM}$ corresponds to an OFF control section. Each unit control section corresponds to a sum of one ON control section and one OFF control section. The ON control section is a section where the transistor M1 should be turned on (a section where the transistor M1 should be controlled to be turned on by the PWM control), and the OFF control section is a section where the transistor M1 should be turned off (a section where the transistor M1 should be controlled to be turned off by the PWM control). Therefore, it can be said that the up edge of the signal SET and the up edge of the signal $S_{PWM}$ instruct turn-on of the transistor M1, and the up edge of the signal RST and the down edge of the signal $S_{PWM}$ instruct turn-off of the transistor M1.

Figure 7:
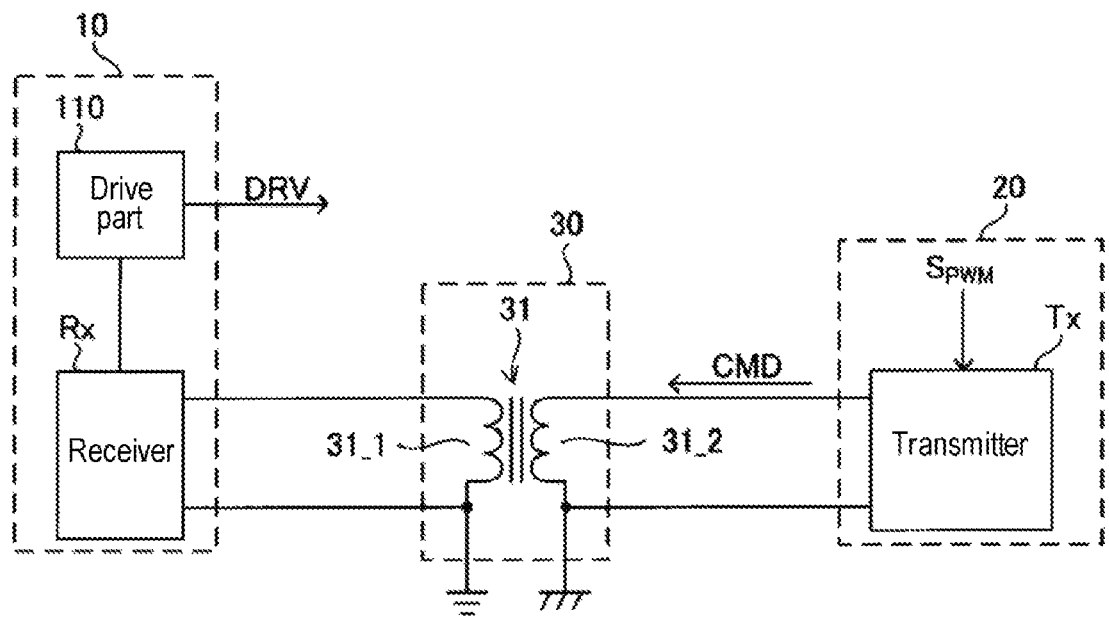
FIG. 7 is a configuration diagram related to signal transmission from a secondary side to a primary side according to the first embodiment of the present disclosure.

Before describing an internal configuration of the on-time setting part 220 illustrated in FIG. 5, a method of transmitting information of the signal $S_{PWM}$ from the secondary side to the primary side will be described with reference to FIG. 7. Referring to FIG. 7, a transmitter Tx is installed in the secondary control circuit 20, while a receiver Rx and a drive part 110 are installed in the primary control circuit 10. The pulse transformer part 30 includes a pulse transformer 31 for transmitting the information of the signal $S_{PWM}$ from the secondary side to the primary side. The pulse transformer 31 includes a primary winding 31_1 arranged in the primary circuit and a secondary winding 31_2 arranged in the secondary circuit, in which the windings 31_1 and 31_2 are magnetically coupled to each other while being insulated. The transmitter Tx is connected to the secondary winding 31_2, and the receiver Rx is connected to the primary winding 31_1.

The signal $S_{PWM}$ is supplied to the transmitter Tx. The transmitter Tx outputs a command signal CMD at a timing when an up edge or a down edge occurs in the signal $S_{PWM}$. The command signal CMD from the transmitter Tx is a pulse signal output and supplied to the secondary winding 31_2 of the pulse transformer 31. The pulse signal is a rectangular wave signal whose signal level becomes a high level by a minute pulse width with a low level as a starting point. The command signal CMD includes a command signal $CMD_{ON}$ output from the transmitter Tx at the up edge timing of the signal $S_{PWM}$ and a command signal $CMD_{OFF}$ output from the transmitter Tx at the down edge timing of the signal $S_{PWM}$.

That is, the transmitter Tx outputs the command signal $CMD_{ON}$ at a transition timing from the OFF control section to the ON control section and outputs the command signal $CMD_{OFF}$ at a transition timing from the ON control section to the OFF control section, based on the signal $S_{PWM}$. The command signal $CMD_{ON}$ is a command signal instructing that the switching transistor M1 should be turned on, and the command signal $CMD_{OFF}$ is a command signal instructing that the switching transistor M1 should be turned off. It may be understood that the command signal $CMD_{ON}$ functions as a signal instructing turn-on of the switching transistor M1, while the command signal $CMD_{OFF}$ functions as a signal instructing turn-off of the switching transistor M1.

The receiver Rx receives the command signal CMD via the pulse transformer 31. When the pulse signal as the command signal CMD is supplied to the secondary winding 31_2, a voltage corresponding to the pulse signal is generated in the primary winding 31_1. The receiver Rx restores the pulse signal from the voltage generated in the primary winding 31_1 by using a comparator or the like, and transmits the restored pulse signal to the drive part 110 as the received command signal CMD. When the command signal $CMD_{ON}$ is received by the receiver Rx as the command signal CMD, the command signal CMD transmitted to the drive part 110 functions as the command signal $CMD_{ON}$, and when the command signal $CMD_{OFF}$ is received by the receiver Rx as the command signal CMD, the command signal CMD transmitted to the drive part 110 also functions as the command signal $CMD_{OFF}$. In this manner, the information of the signal $S_{PWM}$ is transmitted from the secondary control circuit 20 to the primary control circuit 10 as the command signals $CMD_{ON}$ and $CMD_{OFF}$.

The drive part 110 turns on and off the transistor M1 by supplying the driving signal DRV to the gate of the switching transistor M1. When the secondary control is performed, the drive part 110 turns on the transistor M1 in response to reception of the command signal $CMD_{ON}$, and turns off the transistor M1 in response to reception of the command signal $CMD_{OFF}$.

The pulse signal as the command signal $CMD_{ON}$ and the pulse signal as the command signal $CMD_{OFF}$ may be signals having the same waveform. In this case, the two signals cannot be distinguished from the signal waveforms, but the command signal CMD first output from the transmitter Tx at the start time of the secondary control is assumed to be the command signal $CMD_{ON}$ in response to the up edge of the signal $S_{PWM}$. Then, since the transistor M1 is turned off at the start time of the secondary control, the primary control circuit 10 (the receiver Rx and the drive part 110) can determine that the command signal CMD received at an odd number of times after the start of the secondary control is the command signal $CMD_{ON}$, and that the command signal CMD received at an even number of times is the command signal $CMD_{OFF}$. As a result, in the secondary control, the primary control circuit 10 (the drive part 110) turns on the transistor M1 in response to the reception of the command signal CMD ($CMD_{ON}$) corresponding to the up edge of the signal $S_{PWM}$, and turns off the transistor M1 in response to the reception of the command signal CMD ($CMD_{OFF}$) corresponding to the down edge of the signal $S_{PWM}$.

Therefore, in the secondary control, if a delay such as a transmission delay or the like is ignored, the transistor M1 is turned on in the ON control section of the signal $S_{PWM}$ and the transistor M1 is turned off in the OFF control section of the signal $S_{PWM}$, as illustrated in FIG. 6. That is, in the secondary control, the duty of the transistor M1 substantially matches the duty of the signal $S_{PWM}$, and the transistor M1 is switched at the PWM frequency $f_O$ by the primary control circuit 10 based on the signal $S_{PWM}$ (based on the received command signals $CMD_{ON}$ and $CMD_{OFF}$). The duty of the transistor M1 refers to a ratio of the ON section of the transistor M1 to a total section of the ON section and the OFF section of the transistor M1 (in other words, a ratio of the ON section of the transistor M1 in each unit control section). The duty of the signal $S_{PWM}$ refers to a ratio of the high level section of the signal $S_{PWM}$ to a total section of the low level section and the high level section of the signal $S_{PWM}$ (in other words, a ratio of high level section of the signal $S_{PWM}$ in each unit control section).

In addition, a synchronous rectification controller (not shown) for controlling ON/OFF of the SR transistor M2 is installed in the secondary control circuit 20. Before the start of the secondary control, the SR transistor M2 is fixed to an OFF state. When the secondary control starts, the synchronous rectification controller turns off the SR transistor M2 in the high level section of the signal $S_{PWM}$, and turns on the SR transistor M2 in all or a part of the low level section of the signal $S_{PWM}$.

A configuration and an operation of the on-time setting part 220 will be described with reference to FIG. 5 again. The on-time setting part 220 includes a feedback voltage generation circuit 221, a comparator part 222, a duty information acquisition part 223, an adder 224, and an on-time counter 225. The comparator part 222 includes a current output comparator 222a and a capacitor 222b.

The feedback voltage generation circuit 221 generates and outputs a feedback voltage $V_{FB}$ based on the voltage $V_B$ (see FIG. 2). The circuit 221 is configured as, for example, an amplifier (including a voltage follower) for amplifying the voltage $V_B$. The circuit 221 may include a filter. It is assumed here that the feedback voltage $V_{FB}$ is a voltage obtained by multiplying the voltage $V_B$ by a predetermined gain (which may be one time). Also, the circuit 221 may be omitted and the connection node between resistors R3 and R4 may be directly connected to the comparator 222a. In any case, the feedback voltage $V_{FB}$ becomes a voltage proportional to the secondary voltage $V_S$.

In the comparator 222a, the feedback voltage $V_{FB}$ is input to an inverting input terminal, a predetermined reference voltage $V_{REF}$ is input to a non-inverting input terminal, and an output terminal is connected to one end of the capacitor 222b. A resistor (not shown) may be inserted between the output terminal of the comparator 222a and one end of the capacitor 222b. The reference voltage $V_{REF}$ has a predetermined positive DC voltage value. The comparator 222a compares the voltages $V_{FB}$ and $V_{REF}$ to generate a comparator signal $V_{CMP}$ by charging or discharging the capacitor 222b according to the comparison result. The comparator signal $V_{CMP}$ is a voltage signal having a value of a voltage between both terminals of the capacitor 222b as its own signal value, and is transmitted to the adder 224.

Specifically, the comparator 222a raises the voltage between both terminals of the capacitor 222b (i.e., raises the level of the signal $V_{CMP}$) by discharging electric charge toward the capacitor 222b so that the capacitor 222b is charged when "$V_{REF} > V_{FB}$," and lowers the voltage between both terminals of the capacitor 222b (i.e., lowers the level of the signal $V_{CMP}$) by drawing electric charge stored in the capacitor 222b so that the capacitor 222b is discharged when "$V_{REF} < V_{FB}$." Furthermore, when "$V_{REF} < V_{FB}$," the capacitor 222b may be discharged not via the comparator 222a itself but via another circuit included in the comparator part 222. When "$V_{REF} = V_{FB}$," the comparator 222a does not cause a change in the voltage between both terminals of the capacitor 222b. The target voltage $V_{TG}$ is determined based on the reference voltage $V_{REF}$, and when the feedback voltage $V_{FB}$ matches the reference voltage $V_{REF}$, the secondary voltage $V_S$ matches the target voltage $V_{TG}$.

The duty information acquisition part 223 acquires a duty information signal $V_{DUTY}$ indicating the duty of the transistor M1 and transmits it to the adder 224. The duty information signal $V_{DUTY}$ is a voltage signal obtained by converting the duty of the transistor M1 into an analog voltage, and has a signal value obtained by multiplying the duty of the transistor M1 by a predetermined positive coefficient.

The duty of the transistor M1 is represented by "$V_{OR}/V_P = (N_S/N_P) \times V_S/V_P$," where $V_{OR}$ is an induced voltage generated by the transformer TR, and $N_P$ and $N_S$ are the numbers of turns of the primary winding W1 and the secondary winding W2 of the transformer TR, respectively. In this manner, the duty of the transistor M1 contains the information of the primary voltage $V_P$ and the secondary voltage $V_S$, and switching can be stabilized by feeding back the information.

The adder 224 adds the comparator signal $V_{CMP}$ to the duty information signal $V_{DUTY}$ to generate a voltage signal $V_{DUTY'}$ indicating the addition result. Therefore, "$V_{DUTY'} = V_{DUTY} + V_{CMP}$." Since such addition is equivalent to correcting the duty information signal $V_{DUTY}$ by the comparator signal $V_{CMP}$, the voltage signal $V_{DUTY'}$ will also be referred to as a corrected duty information signal $V_{DUTY'}$, and it can be said that the adder 224 functions as a correction part.

The on-time counter 225 sets an on-time of the transistor M1 based on the corrected duty information signal $V_{DUTY'}$. The setting of the on-time of the transistor M1 refers to setting a time when the transistor M1 is turned on in each unit control section, in which the setting is realized by the signal RST.

Figure 8:
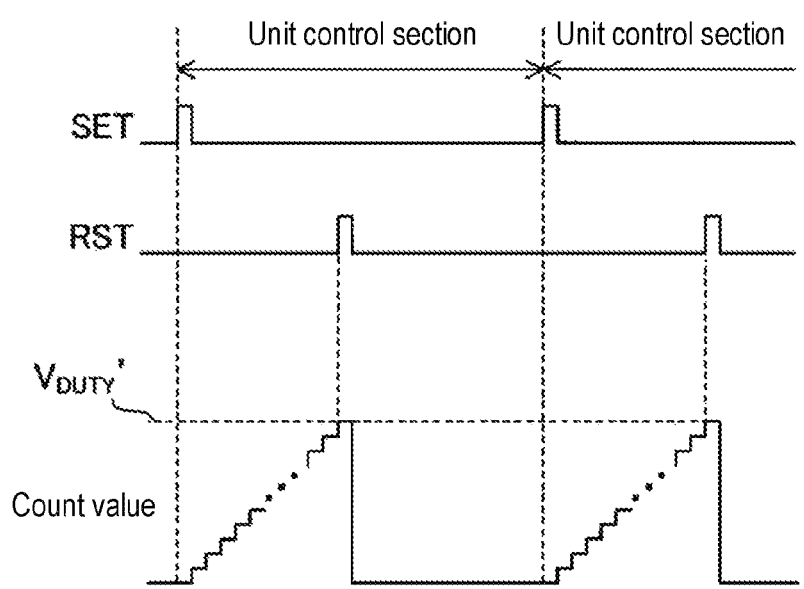
FIG. 8 is an explanatory diagram of a counter operation for setting an on-time of the switching transistor according to the first embodiment of the present disclosure.

An operation of the on-time counter 225 will be described with reference to FIG. 8. A clock signal having a clock frequency sufficiently higher than the PWM frequency is input to the on-time counter 225. In the clock signal, up edges periodically occur at the clock frequency. The on-time counter 225 measures a time corresponding to the corrected duty information signal $V_{DUTY'}$ using the clock signal, and sets the measured time as the on-time of the transistor M1. Specifically, in each unit control section, the counter 225 counts the number of times the up edge of the clock signal occurs from the up edge timing of the signal SET as a count value to allow up edge to occur in the signal RST at a timing when the count value reaches a signal value of the corrected duty information signal $V_{DUTY'}$. The signal RST of a high level is returned to a low level before a next unit control section arrives.

As described above (see FIG. 6), the PWM signal generator 230 switches the level of the signal $S_{PWM}$ from a low level to a high level at the up edge timing of the signal SET, and also switches the level of the signal $S_{PWM}$ from a high level to a low level at the up edge timing of the signal RST. Therefore, in each unit control section, the section from the up edge timing of the signal SET to the up edge timing of the signal RST becomes the ON control section, and the length of the section becomes the on-time (the length of the on-time) of the transistor M1.

[Comparison With Reference Configurations]

Figure 9A:
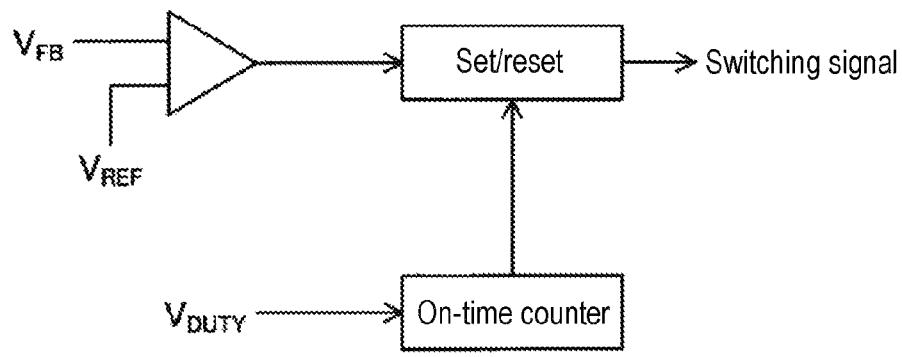
FIG. 9A is a configuration diagram of a first reference device provided for comparison with the configuration of the first embodiment of the present disclosure.
Figure 9B:
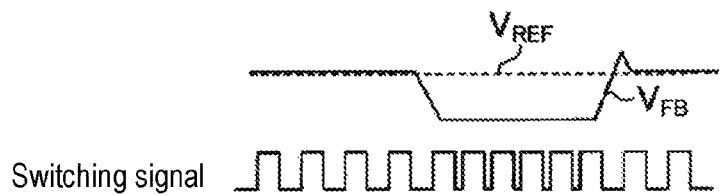
FIG. 9B is a signal waveform in the first reference device.

The operation of the PWM controller 200 in FIG. 5 will be additionally described via a comparison with reference configurations. FIG. 9A illustrates an essential part configuration of a first reference device adopting the on-time control method, and FIG. 9B illustrates various signal waveforms in the first reference device. The first reference device generates a switching signal for the transistor M1 by setting an on-time based on the duty information signal $V_{DUTY}$. As described above, the duty of the transistor M1 contains the information of the primary voltage $V_P$ and the secondary voltage $V_S$, and switching can be stabilized by feeding back the information.

In the first reference device, the switching frequency is kept constant in a stable state in which "$V_{FB}=V_{REF}$." But when "$V_{FB}<V_{REF}$" is established according to an increase in the load, for example, as illustrated in FIGS. 9A and 9B, the device again goes to a stable state by increasing the switching frequency without changing the on-time. The on-time control method has merits that it has high load responsiveness and contributes to a reduction in the number of required parts, but involves a change in switching frequency (i.e., belongs to PFM control).

Figure 10:
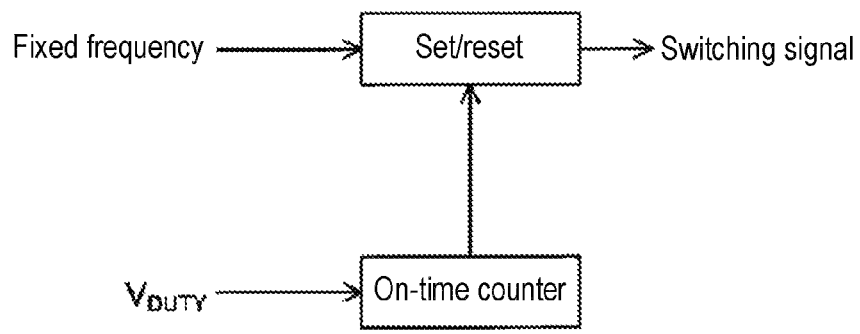
FIG. 10 is a configuration diagram of a second reference device provided for comparison with the configuration of the first embodiment of the present disclosure.

In the AC/DC converter, it is important to cope with noise, but the adoption of the control method involving a change in the switching frequency makes it difficult to cope with noise. For this reason, the control method such as the first reference device is often avoided in the AC/DC converter. If the merits of the on-time control method are to be obtained while fixing the switching frequency, a second reference device as illustrated in FIG. 10 is considered. In the second reference device in FIG. 10, an operation similar to the on-time control method is realized in a state in which the switching frequency is fixed. After the stable state of "$V_{FB}=V_{REF}$" is once realized, if it is assumed that there is no change in the primary voltage $V_P$ and the power consumption of the load LD, the second reference device is also driven without any problem. However, when "$V_{FB}<V_{REF}$" due to an increase in the load, for example, the second reference device cannot cope with it in any way. Measures for the variation of the voltage $V_{FB}$ (i.e., the variation of the secondary voltage $V_S$) are required.

The application of the measures to the second reference device corresponds to the PWM controller 200 in FIG. 5. In the configuration of FIG. 5, a first stable state in which the comparator signal $V_{CMP}$ is at a certain level and the secondary voltage $V_S$ is stabilized at the target voltage $V_{TG}$ is considered as a reference.

For example, in the PWM controller 200, when the secondary voltage $V_S$ drops with the first stable state as a starting point to become "$V_{FB}<V_{REF}$" (i.e., when "$V_S<V_{TG}$"), correction in an increasing direction is applied to the duty information signal $V_{DUTY}$ via the increase of the level of the comparator signal $V_{CMP}$ (the signal after the correction corresponds to the signal $V_{DUTY'}$). By the correction of the duty information signal $V_{DUTY}$ in the increasing direction, the on-time of the transistor M1 is increased (i.e., the on-time of the transistor M1 is corrected to increase based on the first stable state), and the secondary voltage $V_S$ rises. Consequently, the secondary voltage $V_S$ again reaches a second stable state in which the secondary voltage $V_S$ is stabilized at the target voltage $V_{TG}$.

Conversely, in the PWM controller 200, when the secondary voltage $V_S$ rises with the first stable state as a starting point to become "$V_{FB}>V_{REF}$" (i.e., when "$V_S>V_{TG}$"), correction in a decreasing direction is applied to the duty information signal $V_{DUTY}$ via the decrease of the level of the comparator signal $V_{CMP}$ (the signal after the correction corresponds to the signal $V_{DUTY'}$). By the correction of the duty information signal $V_{DUTY}$ in the decreasing direction, the on-time of the transistor M1 is decreased (i.e., the on-time of the transistor M1 is corrected to decrease based on the first stable state), and the secondary voltage $V_S$ drops. Consequently, the secondary voltage $V_S$ again reaches a third stable state in which the secondary voltage $V_S$ is stabilized at the target voltage $V_{TG}$.

As described above, the PWM controller 200 (see FIG. 5) includes the oscillator 210 generating the oscillation signal (SET) having a predetermined PWM frequency $f_O$, the on-time setting part 220 setting the on-time of the switching transistor M1 based on the comparison result of the feedback voltage $V_{FB}$ according to the secondary voltage $V_S$ and the predetermined reference voltage $V_{REF}$ as well as the duty information signal $V_{DUTY}$ indicating the duty of the switching transistor M1, and the PWM signal generator 230 generating and outputting the PWM signal $S_{PWM}$ based on the oscillation signal of the oscillator 210 and the setting result of the on-time setting part 220.

Consequently, the merits of the on-time control method (high load responsiveness, small number of required parts, and the like) can be obtained while using the PWM control which can easily cope with noise.

Specifically, the on-time setting part 220 has the comparator part 222 that generates the comparator signal $V_{CMP}$ according to the comparison result of the feedback voltage $V_{FB}$ and the reference voltage $V_{REF}$ and the correction part 224 that corrects the duty information signal $V_{DUTY}$ by the comparator signal $V_{CMP}$ to generate the corrected duty information signal $V_{DUTY'}$, and the on-time of the switching transistor M1 is set based on the corrected duty information signal $V_{DUTY'}$. The setting result is represented by the signal RST.

More specifically, the on-time setting part 220 includes the counter 225, and sets the on-time of the switching transistor M1 by measuring a time corresponding to the corrected duty information signal $V_{DUTY'}$ in each unit control section using the counter 225.

Furthermore, the secondary voltage $V_S$ is stabilized at the predetermined target voltage $V_{TG}$ by matching the feedback voltage $V_{FB}$ with the reference voltage $V_{REF}$, and the on-time setting part 220 corrects the on-time of the switching transistor M1 to increase based on the feedback voltage $V_{FB}$ when the secondary voltage $V_S$ is lower than the target voltage $V_{TG}$, and corrects the on-time of the switching transistor M1 to decrease based on the feedback voltage $V_{FB}$ when the secondary voltage $V_S$ is higher than the target voltage $V_{TG}$.

In addition, a first section (ON control section) where the switching transistor M1 should be turned on and a second section (OFF control section) where the switching transistor M1 should be turned off are indicated in each unit control section according to the PWM signal $S_{PWM}$ generated by the PWM signal generator 230. The PWM signal generator 230 sets the start timing of the first section based on the oscillation signal SET of the oscillator 210 in each unit control section, and sets the length of the first section to the length of the on-time set by the on-time setting part 220.

[Method for Acquiring Duty Information Signal]

The duty information acquisition part 223 may acquire the duty information signal $V_{DUTY}$ from any signal which may specify the duty of the transistor M1.

For example, the acquisition part 223 may generate and acquire the duty information signal $V_{DUTY}$ based on the signal $S_{PWM}$ output from the PWM signal generator 230. In this case, the acquisition part 223 regards the high level section (ON control section) of the signal $S_{PWM}$ as the ON section of the transistor M1 and regards the low level section (OFF control section) of the signal $S_{PWM}$ as the OFF section of the transistor M1, and then may generate and acquire the signal $V_{DUTY}$.

Alternatively, for example, the acquisition part 223 may generate and acquire the duty information signal $V_{DUTY}$ based on the output signal of the transmitter Tx. In this case, the acquisition part 223 may monitor the output signal of the transmitter Tx, and in each unit control section, regard a section after the command signal $CMD_{ON}$ is output by the transmitter Tx until the command signal $CMD_{OFF}$ is output as the ON section of the transistor M1, regard a section until the next command signal $CMD_{ON}$ is output by the transmitter Tx as the OFF section of the transistor M1, and then generate and acquire the signal $V_{DUTY}$.

Alternatively, for example, the acquisition part 223 may generate and acquire the duty information signal $V_{DUTY}$ based on the voltage $V_{DR}$ which varies in response to the switching of the transistor M1 (see FIG. 3). The acquisition part 223 may determine whether the transistor M1 is turned on or off at any observation timing by comparing the voltage $V_A$ corresponding to the voltage $V_{DR}$ with a predetermined voltage at the observation timing, and specify the duty of the transistor M1 using the determination result.

<<Second Embodiment>>

A second embodiment of the present disclosure will be described. The second embodiment and third and fourth embodiments as described later are embodiments based on the first embodiment, and for matters not specifically mentioned in the second to fourth embodiments, the description of the first embodiment may also be applied to the second to fourth embodiments in the absence of contradiction. In interpreting the description of the second embodiment, the description of the second embodiment may be prioritized for matters that are inconsistent between the first and second embodiments (the same applies to the third and fourth embodiments as described below). Some of the first to fourth embodiments may be optionally combined in the absence of contradiction.

The configuration of the insulated synchronous rectification type DC/DC converter has been described above as the DC/DC converter 4 included in the AC/DC converter 1, but the DC/DC converter 4 may be any insulated DC/DC converter as long as it generates the secondary voltage $V_S$ from the primary voltage $V_P$ applied to the primary winding W1 on the secondary side of the transformer TR by the switching method.

For example, the DC/DC converter 4 illustrated in FIG. 2 adopts a so-called low-side application, but may adopt a high-side application. In the DC/DC converter 4 adopting the high-side application, the SR transistor M2 is installed at the output terminal $TM_{2H}$ side, and the SR transistor M2 is inserted in series between the output terminal $TM_{2H}$, to which the secondary voltage $V_S$ is applied, and the secondary side winding W2 of the transformer TR. In addition, the arrangement position of the SR transistor M2 in the secondary circuit may be changed in a form that does not impair the spirit of the present disclosure.

Furthermore, for example, the DC/DC converter 4 may be a DC/DC converter adopting a diode rectification method (an insulated diode rectification type DC/DC converter). In this case, in the DC/DC converter 4, instead of the SR transistor M2 and the parasitic diode D2 in FIG. 2, a rectifying diode is installed in the secondary circuit. The rectifying diode is inserted between the secondary winding W2 and the capacitor C2 to rectify electric power transmitted from the primary winding W1 to the secondary winding W2.

Moreover, for example, the DC/DC converter 4 may be configured as a forward type insulated DC/DC converter, and in this case, either the synchronous rectification method or the diode rectification method may be adopted.

<<Third Embodiment>>

The third embodiment of the present disclosure will be described.

Figure 11:
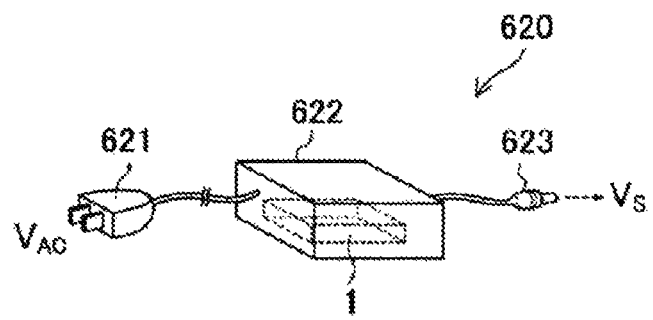
FIG. 11 is a diagram illustrating a configuration of a power adapter according to a third embodiment of the present disclosure.

A power adapter may be configured by using the AC/DC converter 1. FIG. 11 is a diagram illustrating a power adapter 620 including the AC/DC converter 1. The power adapter 620 includes the AC/DC converter 1, a plug 621, a housing 622, and an output connector 623, and the AC/DC converter 1 is accommodated and arranged in the housing 622. The plug 621 receives a commercial AC voltage $V_{AC}$ from an outlet (not shown), and the AC/DC converter 1 generates a DC secondary voltage $V_S$ from the commercial AC voltage $V_{AC}$ input via the plug 621. The secondary voltage $V_S$ is supplied to an arbitrary electric device (not shown) via the output connector 623. Examples of the electric device include a notebook personal computer, an information terminal, a digital camera, a digital video camera, a mobile phone (including those classified as smartphones), and a mobile audio player.

Figure 12A:
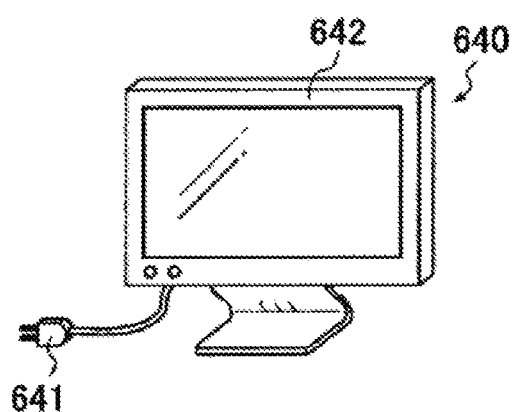
FIGS. 12A and 12B are diagrams illustrating a configuration of an electric device according to the third embodiment of the present disclosure.
Figure 12B:
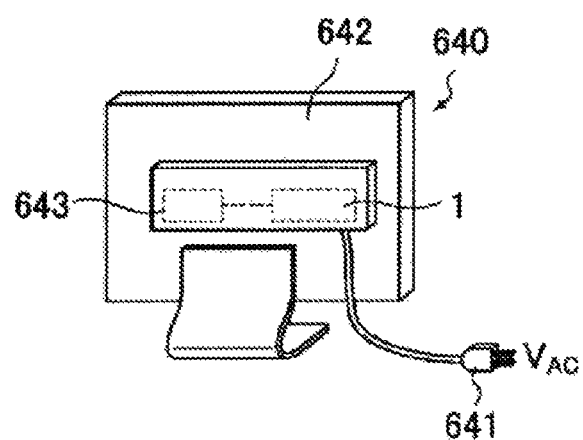

An electric device including the AC/DC converter 1 may be configured. FIGS. 12A and 12B are diagrams illustrating an electric device 640 including the AC/DC converter 1. The electric device 640 illustrated in FIGS. 12A and 12B is a display device, but the type of the electric device 640 is not particularly limited and may be an audio device, a refrigerator, a washing machine, a vacuum cleaner, or the like with the AC/DC converter built therein. The electric device 640 includes the AC/DC converter 1, a plug 641, a housing 642, and a load 643, and the AC/DC converter 1 and the load 643 are accommodated and arranged in the housing 642. The plug 641 receives a commercial AC voltage $V_{AC}$ from an outlet (not shown), and the AC/DC converter 1 generates a DC secondary voltage $V_S$ from the commercial AC voltage $V_{AC}$ input via the plug 641. The generated secondary voltage $V_S$ is supplied to the load 643. The load 643 corresponds to the load LD in FIG. 1. The load 643 may be any load which is driven based on the secondary voltage $V_S$, and is, for example, a microcomputer, a DSP (digital signal processor), a power supply circuit, a lighting device, an analog circuit, or a digital circuit.

<<Fourth Embodiment>>

A fourth embodiment of the present disclosure will be described. In the fourth embodiment, application techniques, modified techniques, and the like applicable to the first to third embodiments will be described.

While it has been described above that the DC/DC converter 4 is used as one of the components of the AC/DC converter 1, the present disclosure is not limited thereto. That is, for example, the DC/DC converter 4 may receive an output voltage of an arbitrary voltage source (for example, a battery) for generating a DC voltage as the primary voltage $V_P$ to generate the secondary voltage $V_S$.

A semiconductor device SMC1 in which the primary control circuit 10, the secondary control circuit 20, and the pulse transformer part 30 are integrated on a one-chip semiconductor substrate may be configured. The semiconductor device SMC1 is configured by accommodating and encapsulating the one-chip semiconductor substrate on which the primary control circuit 10, the secondary control circuit 20, and the pulse transformer part 30 are integrated, in a package (housing) made of resin.

Alternatively, a semiconductor device SMC2 may be configured by preparing a first chip in which the primary control circuit 10 is integrated on a first semiconductor substrate, a second chip in which the secondary control circuit 20 is integrated on a second semiconductor substrate, and a third chip in which the pulse transformer part 30 is integrated on a third semiconductor substrate, and accommodating and encapsulating the first to third chips in a common package (housing).

However, the primary control circuit 10 and the secondary control circuit 20 may be configured as separate semiconductor devices. That is, a semiconductor device $SMC3_A$ is configured by accommodating and encapsulating the first chip in which the primary control circuit 10 is integrated on the first semiconductor substrate in a first package, and separately from this, a semiconductor device $SMC3_B$ may be configured by accommodating and encapsulating the second chip in which the secondary control circuit 20 is integrated on the second semiconductor substrate in a second package. In this case, the pulse transformer part 30 may be a discrete component installed separately from the semiconductor devices $SMC3_A$ and $SMC3_B$, but a semiconductor device $SMC_C$ may be configured by accommodating and encapsulating the third chip in which the pulse transformer part 30 is integrated on the third semiconductor substrate in a third package. In the semiconductor devices SMC1, SMC2, and $SMC3_C$, the pulse transformer may be configured by using the existing integrated circuit process.

The switching transistor M1 may be further integrated and included in the semiconductor device (SMC1, SMC2 or $SMC3_A$) in which the primary control circuit 10 is integrated, or the sense resistor $R_{CS}$ may be further integrated and included therein.

The SR device M2 may be further integrated and included in the semiconductor device (SMC1, SMC2 or $SMC3_B$) in which the secondary control circuit 20 is integrated, the voltage dividing resistors R1 and R2 may be further integrated and included therein, or the voltage dividing resistors R3 and R4 may be further integrated and included therein.

The relationship between a high level and a low level of any signal or voltage may be reversed in a form that does not impair the spirit of the present disclosure described above. Furthermore, the channel type of the FET may be optionally changed in a form that does not impair the spirit of the present disclosure described above. That is, for example, the configuration of the DC/DC converter 4 may be modified so that the switching transistor M1 is configured as a P-channel MOSFET.

The arbitrary transistor described above may be any type of transistor. For example, the arbitrary transistor described above as the MOSFET (particularly, for example, the switching transistor M1) may be replaced by a junction FET, an IGBT (insulated gate bipolar transistor), or a bipolar transistor. The arbitrary transistor has a first electrode, a second electrode, and a control electrode. In the FET, one of the first and second electrodes is a drain and the other is a source, and the control electrode is a gate. In the IGBT, one of the first and second electrodes is a collector and the other is an emitter, and the control electrode is a gate. In a bipolar transistor which does not belong to the IGBT, one of the first and second electrodes is a collector and the other is an emitter, and the control electrode is a base.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An insulated DC/DC converter configured to generate a secondary voltage on a secondary side of a power transformer from a primary voltage on a primary side of the power transformer by switching a switching element connected to a primary winding of the power transformer while insulating the primary side and the secondary side of the power transformer from each other, the insulated DC/DC converter comprising:
   a communication transformer;
   a secondary control circuit including a PWM controller configured to generate a PWM signal of a constant PWM frequency based on the secondary voltage in a circuit arranged on the secondary side; and
   a primary control circuit configured to switch the switching element at the PWM frequency based on information of the PWM signal transmitted from the secondary control circuit via the communication transformer in a circuit arranged on the primary side,
   wherein the PWM controller includes:
      an oscillator configured to generate an oscillation signal having the PWM frequency;
      an on-time setting part configured to set an on-time of the switching element based on a comparison result of a feedback voltage based on the secondary voltage and a predetermined reference voltage, and a duty information signal indicating a duty of the switching element; and
      a PWM signal generator configured to generate and output the PWM signal based on the oscillation signal and a setting result of the on-time setting part, and
   wherein the on-time setting part includes:
      a comparator part configured to generate a comparator signal based on the comparison result of the feedback voltage and the reference voltage; and
      a correction part configured to correct the duty information signal by the comparator signal to generate a corrected duty information signal, and
   wherein the on-time setting part is configured to set the on-time of the switching element based on the corrected duty information signal.

2. The DC/DC converter of claim 1, wherein the on-time setting part further includes a counter, and
   wherein the on-time setting part is configured to set the on-time of the switching element by measuring a time corresponding to the corrected duty information signal using the counter.

3. The DC/DC converter of claim 1, wherein the secondary voltage is stabilized at a predetermined target voltage by matching the feedback voltage with the reference voltage, and
   wherein the on-time setting part is configured to correct the on-time of the switching element to increase based on the feedback voltage when the secondary voltage is lower than the target voltage, and to correct the on-time of the switching element to decrease based on the feedback voltage when the secondary voltage is higher than the target voltage.

4. The DC/DC converter of claim 1, wherein a first section in which the switching element is turned on and a second section in which the switching element is turned off are indicated by the PWM signal generated by the PWM signal generator, and wherein the PWM signal generator is configured to set a start timing of the first section based on the oscillation signal, and to set a length of the first section to a length of the on-time set by the on-time setting part.

5. The DC/DC converter of claim 4, wherein the first section and the second section are alternately set by the PWM signal generated by the PWM signal generator, wherein the secondary control circuit includes a transmitter configured to output a predetermined ON command signal to the communication transformer at a transition timing from the second section to the first section based on the PWM signal, and to output a predetermined OFF command signal to the communication transformer at a transition timing from the first section to the second section, and wherein the primary control circuit includes a receiver configured to receive the ON command signal and the OFF command signal via the communication transformer, in which the switching element is turned on in response to reception of the ON command signal and the switching element is turned off in response to reception of the OFF command signal.

6. The DC/DC converter of claim 5, wherein the PWM controller includes a duty information acquisition part configured to acquire the duty information signal based on an output signal of the transmitter.

7. The DC/DC converter of claim 1, wherein the PWM controller includes a duty information acquisition part configured to acquire the duty information signal based on the PWM signal output from the PWM signal generator.

8. An AC/DC converter, comprising:
a rectifying circuit configured to full-wave rectify an AC voltage;
a smoothing capacitor configured to smooth the full-wave rectified voltage to generate a DC voltage; and
the DC/DC converter of claim 1, configured to generate a DC secondary voltage as an output voltage from the primary voltage as the DC voltage.

9. A power adapter, comprising:
a plug configured to receive an AC voltage;
the AC/DC converter of claim 8; and
a housing configured to accommodate the AC/DC converter.

10. An electric device, comprising:
the AC/DC converter of claim 8; and
a load driven based on an output voltage of the AC/DC converter.

11. An insulated DC/DC converter configured to generate a secondary voltage on a secondary side of a power transformer from a primary voltage on a primary side of the power transformer by switching a switching element connected to a primary winding of the power transformer while insulating the primary side and the secondary side of the power transformer from each other, the insulated DC/DC converter comprising:
a communication transformer;
a secondary control circuit including a PWM controller configured to generate a PWM signal of a constant PWM frequency based on the secondary voltage in a circuit arranged on the secondary side; and
a primary control circuit configured to switch the switching element at the PWM frequency based on information of the PWM signal transmitted from the secondary control circuit via the communication transformer in a circuit arranged on the primary side,
wherein the PWM controller includes:
an oscillator configured to generate an oscillation signal having the PWM frequency;
an on-time setting part configured to set an on-time of the switching element based on a comparison result of a feedback voltage based on the secondary voltage and a predetermined reference voltage, and a duty information signal indicating a duty of the switching element; and
a PWM signal generator configured to generate and output the PWM signal based on the oscillation signal and a setting result of the on-time setting part,
wherein a voltage varying in response to switching of the switching element is generated at one terminal of the secondary winding of the power transformer, and
wherein the PWM controller includes a duty information acquisition part configured to acquire the duty information signal based on the voltage at the one terminal.

* * * * *